US012260091B2

(12) United States Patent
Dorsey et al.

(10) Patent No.: US 12,260,091 B2
(45) Date of Patent: Mar. 25, 2025

(54) MANAGING INPUT/OUTPUT (I/O) OPERATIONS AT A STORAGE DEVICE

(71) Applicant: Dell Products L.P., Round Rock, TX (US)

(72) Inventors: Kurtis Wayne Dorsey, New Braunfels, TX (US); James Brandon Graham, III, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 18/149,184

(22) Filed: Jan. 3, 2023

(65) Prior Publication Data

US 2024/0220123 A1  Jul. 4, 2024

(51) Int. Cl.
*G06F 3/06* (2006.01)
(52) U.S. Cl.
CPC .......... *G06F 3/0613* (2013.01); *G06F 3/0653* (2013.01); *G06F 3/0673* (2013.01)
(58) Field of Classification Search
CPC ..... G06F 3/0613; G06F 3/0653; G06F 3/0673
USPC ................................................ 711/154, 100
See application file for complete search history.

(56) References Cited

U.S. PATENT DOCUMENTS

| 9,436,391 | B1* | 9/2016 | Lewis | G06F 3/0613 |
| 10,078,465 | B1* | 9/2018 | Wu | G06F 3/061 |
| 2015/0089218 | A1* | 3/2015 | Overby | G06F 21/78 |
| | | | | 713/161 |
| 2022/0027292 | A1* | 1/2022 | Gissin | G06F 13/42 |

* cited by examiner

*Primary Examiner* — Hosain T Alam
*Assistant Examiner* — Zubair Ahmed
(74) *Attorney, Agent, or Firm* — McDermott Will & Emery LLP

(57) ABSTRACT

Managing I/O operations at a storage device, including querying storage device to identify a maximum number of command slots associated with the storage device; providing, to the storage device and at a first throughput, a first set of input/output (I/O) operations for processing at the storage device; updating, based on the first set of I/O operations, a log indicating a number of pending I/O operations to be performed at the storage device; comparing the pending number of I/O operations to the maximum number of command slots of the storage device; determining, based on the comparing, that the pending number of I/O operations is within a first threshold of the maximum number of command slots of the storage device, in response: providing, to the storage device and at a second throughput, a second set of I/O operations for processing at the storage device, the second throughput less than the first throughput.

13 Claims, 4 Drawing Sheets

Table 471 — Control Extension mode page

| Bit Byte | 7 | 6 | 5 | 4 | 3 | 2 | 1 | 0 |
|---|---|---|---|---|---|---|---|---|
| 0 | PS | SPF (1b) | | | PAGE CODE (0Ah) | | | |
| 1 | | | | SUBPAGE CODE (01h) | | | | |
| 2 | (MSB) | | | PAGE LENGTH (001Ch) | | | | |
| 3 | | | | | | | | (LSB) |
| 4 | | | Reserved | | | TCMOS | SCSIP | IALUAE |
| 5 | | | Reserved | | | | INITIAL COMMAND PRIORITY | |
| 6 | | | | MAXIMUM SENSE DATA LENGTH | | | | |
| 7 | | | | NON-SEQUESTERED COMMANDS COUNT | | | | |
| 8 | | | | SEQUESTERED COMMANDS COUNT | | | | |
| 9 | PWROMACT | HRDMACT | SSUMACT | FMTMACT | | Reserved | | |
| 10 | | | | MAXIMUM COMMAND SLOTS | | | | |
| ... | | | | | | | | |
| 31 | | | | | | | | |

MANAGING INPUT/OUTPUT (I/O) OPERATIONS AT A STORAGE DEVICE

BACKGROUND

Field of the Disclosure

The disclosure relates generally to managing input/output (I/O) operations at a storage device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing input/output (I/O) operations at a storage device, the method including querying a storage device to identify a maximum number of command slots associated with the storage device; providing, to the storage device and at a first throughput, a first set of input/output (I/O) operations for processing at the storage device; updating, based on the first set of I/O operations, a log indicating a number of pending I/O operations to be performed at the storage device; comparing the pending number of I/O operations to the maximum number of command slots of the storage device; and determining, based on the comparing, that the pending number of I/O operations is within a first threshold of the maximum number of command slots of the storage device, and in response: providing, to the storage device and at a second throughput, a second set of I/O operations for processing at the storage device, the second throughput less than the first throughput.

Other embodiments of these aspects include corresponding systems, apparatus, and computer programs, configured to perform the actions of the methods, encoded on computer storage devices.

These and other embodiments may each optionally include one or more of the following features. For instance, storing data indicating the maximum number of command slots associated with the storage device. Storing the data further includes storing the data at a control extension mode page associated with the storage device. The storage device is a small computer system interface (SCSI) computing device. Determining that the pending number of I/O is within the first threshold of the maximum number of command slots of the storage device further includes the pending number of I/O operations being less than the maximum number of command slots of the storage device. Determining, based on the comparing, that the pending number I/O operations is within the threshold amount of the maximum number of command slots of the storage device, and in response: identifying a number of the first set of I/O operations that are completed by the storage device; updating the log based on the number of the first set of I/O operations that are completed by the storage device; and providing, to the storage device and at the second throughput, the second set of I/O operations for processing at the storage device. Updating, based on the second set of I/O operations, the log indicating the number of pending I/O operations to be performed at the storage device; comparing the pending number of I/O operations to the maximum number of command slots of the storage device; determining, based on the comparing, that the pending number I/O operations is within a second threshold of the maximum number of command slots of the storage device, and in response: providing, to the storage device and at the second throughput, a third set of I/O operations for processing at the storage device. Determining, based on the comparing, that the pending number I/O operations is within the second threshold of the maximum number of command slots of the storage device, and in response: identifying a number of the second set of I/O operations that are completed by the storage device; updating the log based on the number of the second set of I/O operations that are completed by the storage device; and providing, to the storage device and at the second throughput, the third set of I/O operations for processing at the storage device. The second threshold is less than the first threshold. Updating, based on the second set of I/O operations, the log indicating the number of pending I/O operations to be performed at the storage device; comparing the pending number of I/O operations to the maximum number of command slots of the storage device; determining, based on the comparing, that the pending number I/O operations is not within a second threshold of the maximum number of command slots of the storage device, and in response: providing, to the storage device and at the first throughput, a fourth set of I/O operations for processing at the storage device. Determining, based on the comparing, that the pending number I/O operations is not within the first threshold of the maximum number of command slots of the storage device, and in response: providing, to the storage device and at the first throughput, a fifth set of I/O operations for processing at the storage device.

Particular implementations of the subject matter described in this specification can be implemented so as to realize one or more of the following advantages. For example, system performance is increased and data latency is decreased.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIG. 4 illustrates a control extension mode page.

DESCRIPTION OF PARTICULAR EMBODIMENT(S)

Figure 1:
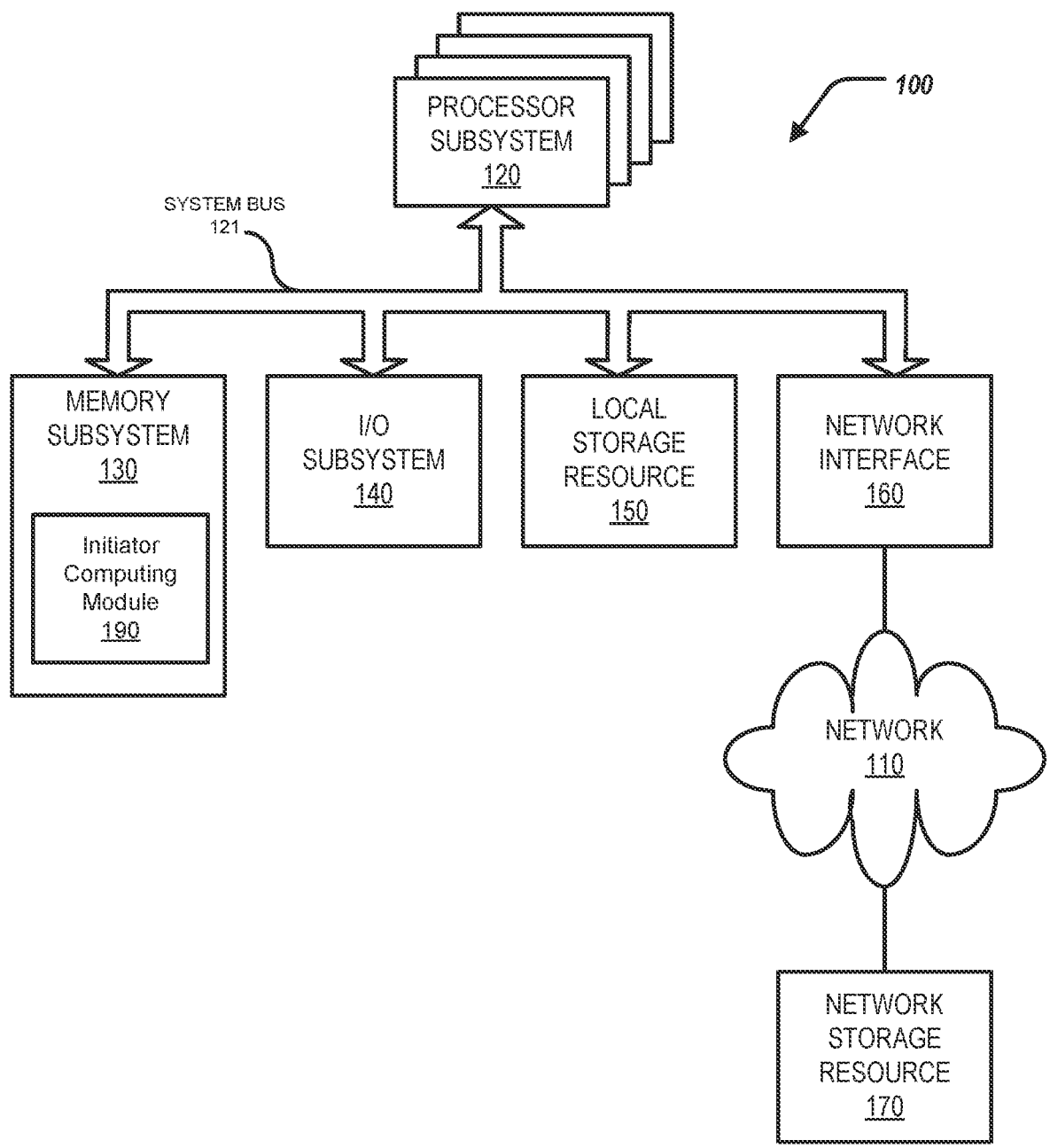
FIG. 1 is a block diagram of selected elements of an embodiment of an information handling system.

This disclosure discusses methods and systems for managing input/output (I/O) operations at a storage device. In short, a small computer system interface (SCSI) initiator can receive data indicating a maximum number of command slots of a small computer system interface (SCSI) target. The SCSI initiator then has the ability to not exceed the maximum number of command slots of the SCSI target and can adjust an input/output command rate to increase system performance and decrease latency.

Specifically, this disclosure discusses a system and a method for managing input/output (I/O) operations at a storage device, including querying a storage device to identify a maximum number of command slots associated with the storage device; providing, to the storage device and at a first throughput, a first set of input/output (I/O) operations for processing at the storage device; updating, based on the first set of I/O operations, a log indicating a number of pending I/O operations to be performed at the storage device; comparing the pending number of I/O operations to the maximum number of command slots of the storage device; determining, based on the comparing, that the pending number of I/O operations is within a first threshold of the maximum number of command slots of the storage device, and in response: providing, to the storage device and at a second throughput, a second set of I/O operations for processing at the storage device, the second throughput less than the first throughput.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

Ins particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an initiator computing module 190. The initiator computing module 190 can be included by the memory subsystem 130. The initiator computing module 190 can include a computer-executable program (software). The initiator computing module 190 can be executed by the processor subsystem 120.

In short, the initiator computing module (e.g., a small computer system interface (SCSI) initiator) can receive data indicating a maximum number of command slots of a small computer system interface (SCSI) target (e.g., storage device). The SCSI initiator then has the ability to not exceed the maximum number of command slots of the SCSI target and can adjust an input/output command rate to increase system performance and decrease latency.

Figure 2:
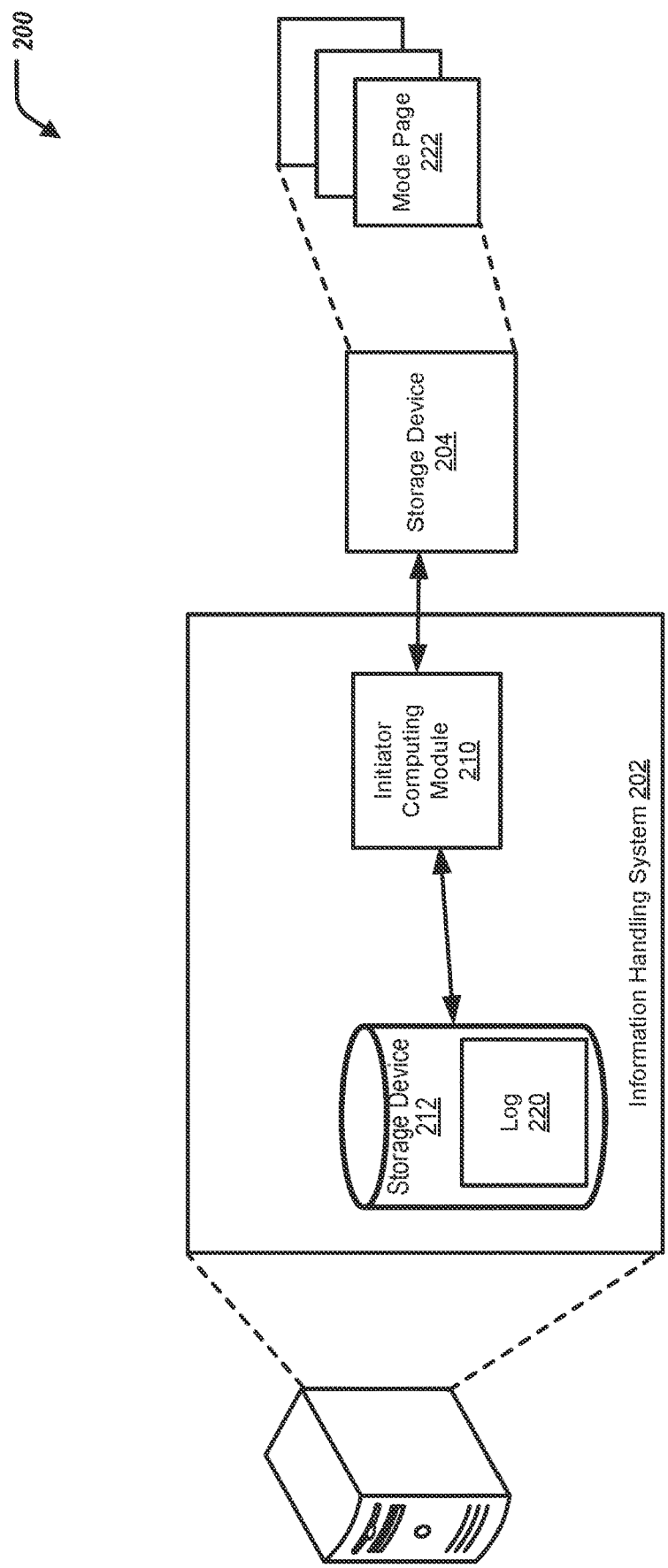
FIG. 2 illustrates a block diagram of a computing environment for managing input/output (I/O) operations at a storage device

Turning to FIG. 2, FIG. 2 illustrates an environment 200 including an information handling system 202 and a storage device 204. The information handling system 202 can include an initiator computing module 210 and a storage device 212. In some examples, the information handling system 202 includes the storage device 204. In some examples, the information handling system 202 is similar to, or includes, the information handling system 100 of FIG. 1. In some examples, the initiator computing module 210 is the same, or substantially the same, as the initiator computing module 190 of FIG. 1.

The information handling system 202, and specifically, the initiator computing module 210, can be in communication with the storage device 204. The initiator computing module 210 can be in communication with the storage device 212. The storage device 212 can store a log 220.

In some examples, the storage device 204 is a small computer system interface (SCSI) computing device. For examples, the storage device 204 can be a hard disk drive (HDD) or a solid state drive (SSD). The storage device 204 can be any type of storage device. In some examples, the storage device 204 can represent any type of device that is implemented via a SCSI interface.

The storage device 204 can be associated with command slots. In other words, the storage device 204 can support a maximum number of command slots—a maximum number of input/output (I/O) data transfers the storage device 204 can handle at any one time. Furthermore, the storage device 204 can be associated with mode pages 222. In an example, the mode pages 222 can include a control extension mode page 222, shown in FIG. 4. The storage device 204 can store data representing the maximum number of command slots associated with the storage device 204 at the control extension mode page 222. For example, the control extension mode page 222 can store data indicating the maximum number of command slots of the storage device 204 at reserve bytes 402 (e.g., 16 bit field).

Figure 3:
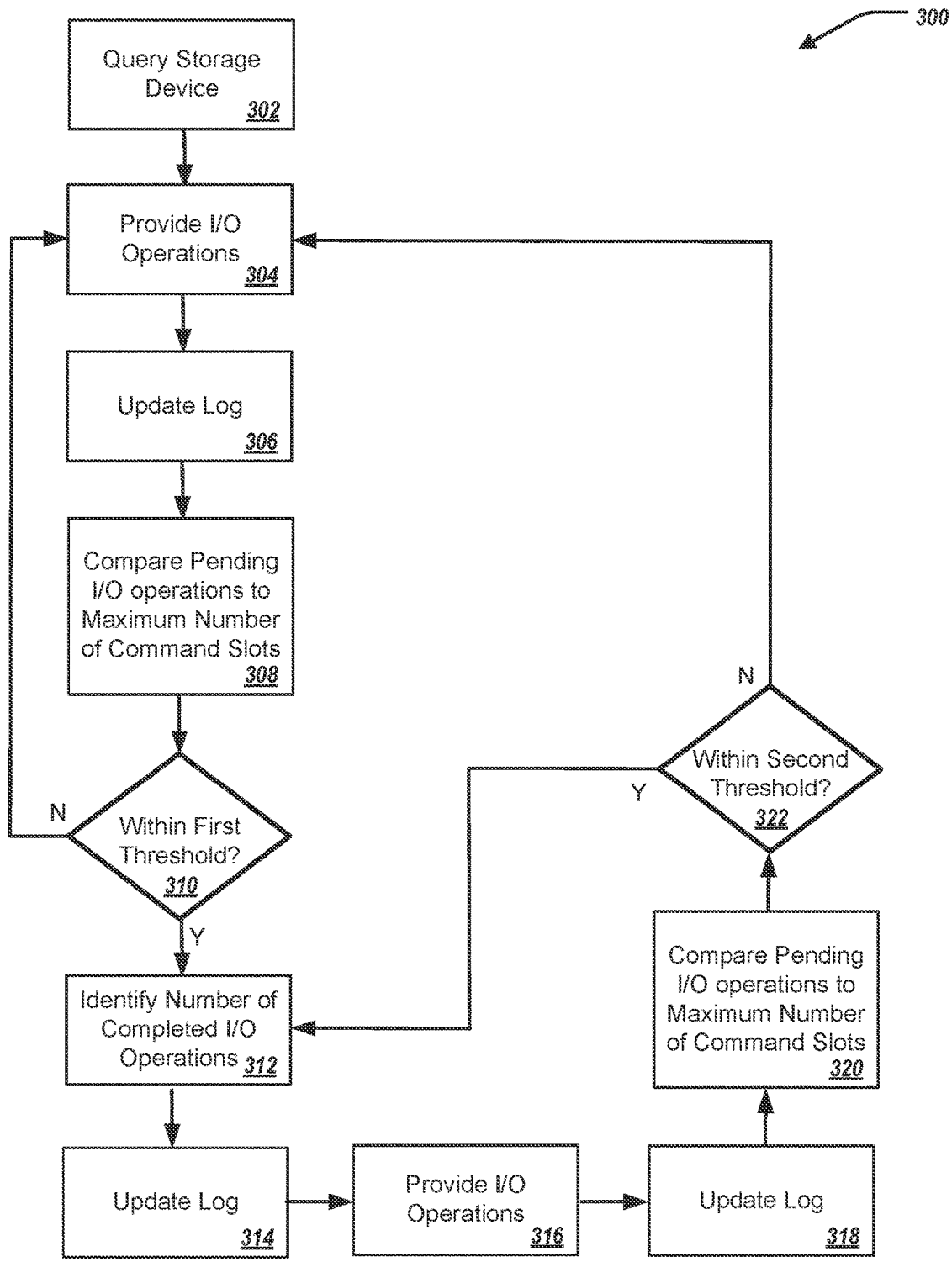
FIG. 3 illustrates a method for managing input/output (I/O) operations at a storage device.

FIG. 3 illustrates a flowchart depicting selected elements of an embodiment of a method 300 for managing input/output (I/O) operations at the storage device 204. The method 300 may be performed by the information handling system 100, the information handling system 202, and/or the initiator computing module 210, and with reference to FIGS. 1-2. It is noted that certain operations described in method 300 may be optional or may be rearranged in different embodiments.

The initiator computing module 210 can query the storage device 204 to identify a maximum number of command slots associated with the storage device, at 302. In some examples, the storage device 204 accesses the control extension mode page 222 to identify the maximum number of command slots associated with the storage device 204, and provides data indicating such to the initiator computing module 210. In some examples, the initiator computing module 210 can store at the log 220 data indicating the maximum number of command slots associated with the storage device 204.

The initiator computing module 210 receives the data indicating the maximum number of command slots associated with the storage device 204 from the storage device 204. The initiator computing module 210 provides, to the storage device 204 and at a first throughput, a first set of input/output (I/O) operations for processing at the storage device 204, at 304. The storage device 204 can receive the first set of I/O operations. The first throughput can be a rate at which the initiator computing module 210 provides the first set of I/O operations (rate of delivery) to the storage device 204.

The initiator computing module 210 updates, based on the first set of I/O operations, the log 220 indicating a number of pending I/O operations to be performed at the storage device 204, at 306. For example, when the initiator computing module 210 provides the first set of I/O operations to the storage device 204, the initiator computing module 210 can update the log 220 to indicate the number of the first set of I/O operations sent to the storage device 204. In the current example, as the first set of I/O operations are the initial set of I/O operations sent to the storage device 204, the initiator computing module 210 updates the log 220 to indicate the pending I/O operations are the first set of I/O operations. However, when the log 220 includes data indicating previously sent I/O operations, the initiator computing module 210 updates the log 220 to add data indicating the first set of I/O operations to the data indicating the previously sent I/O operations.

The initiator computing module 210 compares the pending number of I/O operations to the maximum number of command slots of the storage device 204, at 308. That is, as the data indicating the pending number of I/O operations and the maximum number of command slots of the storage device 204 are stored by the log 220 at the storage device 212, the initiator computing module 210 compares the two. In the current example, as the log 220 indicates the first set of I/O operations, the initiator computing module 210 can compare the number of the first set of I/O operations to the maximum number of command slots of the storage device 204.

The initiator computing module 210 determines, based on the comparing, whether the pending number of I/O operations is within a first threshold of the maximum number of command slots of the storage device 204, at 310. In some examples, the first threshold can be set as a threshold number of the maximum number of command slots (e.g., 1, 5, 10, 100). For example, if the maximum number of command slots is x, the first threshold can be set as x−first threshold (e.g., x−1, x−5, x−10, x−100). In some examples, the first threshold can be set as a threshold percentage of the maximum number of command slots (e.g., 1%, 5%, 10%). For example, if the maximum number of command slots is x, the first threshold can be set as x×first threshold (e.g., x×1%, x×5%, x×10%).

In some examples, determining whether the whether the pending number of I/O operations is within the first threshold of the maximum number of command slots of the storage device 204 further includes the pending number of I/O operations being less than the maximum number of command slots of the storage device 204. That is, the initiator computing module 210 determines whether the pending number of I/O operations is less than the maximum number of command slots of the storage device 204, and whether the pending number of I/O operations is within the first threshold of the maximum number of command slots of the storage device 204.

The initiator computing module 210, in response to determining that the pending number of I/O operations is within the first threshold of the maximum number of command slots of the storage device 204, identifies a number of the first set of I/O operations that are completed by the storage device 204, at 312. That is, the storage device 204 can process one or more of the I/O operations of the first set of I/O operations. In some examples, the initiator computing module 210 can query the storage device 204, with the storage device 204 providing data indicating the number of the first set of I/O operations that are completed. In some examples, the storage device 204 can provide data indicating the number of the first set of I/O operations that are completed automatically to the initiator computing module 210. In some examples, the storage device 204 can provide data indicating the number of the first set of I/O operations that are completed automatically when a I/O operation is completed to the initiator computing module 210, or at predetermined intervals.

The initiator computing module 210 updates, based on the number of the first set of I/O operations that are completed by the storage device 204, the log 220 indicating the number of pending I/O operations to be performed at the storage device 204, at 314. For example, when the initiator computing module 210 provides the first set of I/O operations to the storage device 204 and the storage device 204 completes a portion of the first set of I/O operations, the initiator computing module 210 updates the log 220 to indicate the number of pending (not completed) I/O operations at the storage device 204.

The initiator computing module 210 provides, to the storage device 204 and at a second throughput, a second set of input/output (I/O) operations for processing at the storage device 204, at 316. The storage device 204 can receive the second set of I/O operations. The second throughput can be a rate at which the initiator computing module 210 provides the second set of I/O operations (rate of delivery) to the storage device 204. In some examples, the second throughput is less than the first throughput. That is, when the number of pending number of I/O operations is within the first threshold of the maximum number of command slots of the storage device 204, the initiator computing module 210 adjusts the throughput that the initiator computing module 210 provides I/O operations to the storage device 204 from the first (higher) throughput to the second (lower) throughput. As a result, latency spikes at the storage device 204 are minimized, or prevented.

The initiator computing module 210 updates, based on the second set of I/O operations, the log 220 indicating the number of pending I/O operations to be performed at the storage device 204, at 318. For example, the log 220 can previously indicate the number of pending (not completed) I/O operations at the storage device 204. The log 220 can now be updated to add data indicating the second set of I/O operations to the data indicating the pending number of I/O operations at the storage device 204. This updated data can now be reflective of the total number of pending I/O operations to be performed at the storage device 204—the number of the previously pending I/O operations and the second set of I/O operations.

The initiator computing module 210 compares the pending number of I/O operations to the maximum number of command slots of the storage device 204, at 320. That is, as the data indicating the pending number of I/O operations and the maximum number of command slots of the storage device 204 are stored by the log 220 at the storage device 212, the initiator computing module 210 compares the two. In the current example, the log 220 indicates the total number of pending I/O operations to be performed at the storage device 204—the number of the previously pending I/O operations and the second set of I/O operations. The initiator computing module 210 compares the total number of pending I/O operations to be performed at the storage device 204 (the number of the previously pending I/O operations and the second set of I/O operations) with the maximum number of command slots of the storage device 204.

In some examples, the initiator computing module 210 determines, based on the comparing, whether the pending number of I/O operations is within a second threshold of the maximum number of command slots of the storage device 204, at 322. In some examples, the second threshold can be set as a threshold number of the maximum number of command slots (e.g., 1, 5, 10, 100). For example, if the maximum number of command slots is x, the second threshold can be set as x−second threshold (e.g., x−1, x−5, x−10, x−100). In some examples, the second threshold can be set as a threshold percentage of the maximum number of command slots (e.g., 1%, 5%, 10%). For example, if the maximum number of command slots is x, the second threshold can be set as x×second threshold (e.g., x×1%, x×5%, x×10%).

In some examples, the second threshold is approximately the same as the first threshold. In some examples, the second threshold is greater than the first threshold. In some examples, the second threshold is less than the first threshold.

In some examples, the initiator computing module 210, in response to determining that the pending number of I/O operations is within the second threshold of the maximum number of command slots of the storage device 204, returns to step 312. That is, the initiator computing module 210 identifies a number of the second set of I/O operations that are completed by the storage device 204. That is, the storage device 204 can process one or more of the second set of the I/O operations provided to the storage device 204. In some examples, the initiator computing module 210 can query the storage device 204, with the storage device 204 providing data indicating the number of the second set of I/O operations that are completed. In some examples, the storage device 204 can provide data indicating the number of the second set of I/O operations that are completed automatically to the initiator computing module 210. In some examples, the storage device 204 can provide data indicating the number of the second set of I/O operations that are completed automatically when a I/O operation is completed to the initiator computing module 210, or at predetermined intervals. The initiator computing module 210 updates, based on the number of the second set of I/O operations that are completed by the storage device 204, the log 220 indicating the number of pending I/O operations to be performed at the storage device 204, at 314. For example, when the storage device 204 completes a portion of the second set of I/O operations, the initiator computing module 210 updates the log 220 to indicate the number of pending (not completed) I/O operations at the storage device 204. The initiator computing module 210 provides, to the storage device 204 and at the second throughput, a third set of input/output (I/O) operations for processing at the storage device 204, at 316. The storage device 204 can receive the third set of I/O operations.

In some examples, the initiator computing module 210, in response to determining that the pending number of I/O operations is not within the second threshold of the maximum number of command slots of the storage device 204, returns to step 304. The initiator computing module 210 provides, to the storage device 204 and at the first throughput, a fourth set of input/output (I/O) operations for processing at the storage device 204, at 304. The storage device 204 can receive the fourth set of I/O operations.

In some examples, the initiator computing module 210, in response to determining that the pending number of I/O operations is not within the first threshold of the maximum number of command slots of the storage device 204 (at 310), returns to step 304. The initiator computing module 210 provides, to the storage device 204 and at the first throughput, a fifth set of input/output (I/O) operations for processing at the storage device 204, at 304. The storage device 204 can receive the fifth set of I/O operations.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing input/output (I/O) operations at a storage device, the method comprising:
    storing data indicating a maximum number of command slots associated with the storage device at a control extension mode page of the storage device;
    querying the storage device to identify the maximum number of command slots associated with the storage device;
    providing, to the storage device and at a first throughput, a first set of input/output (I/O) operations for processing at the storage device;
    updating, based on the first set of I/O operations, a log indicating a number of pending I/O operations to be performed at the storage device;
    comparing the pending number of I/O operations to the maximum number of command slots of the storage device; and
    determining, based on the comparing, that the pending number of I/O operations is within a first threshold of the maximum number of command slots of the storage device, wherein the first threshold of the maximum number of command slots of the storage device is less than the maximum number of command slots of the storage device, and in response:
    providing, to the storage device and at a second throughput, a second set of I/O operations for processing at the storage device, the second throughput less than the first throughput;
    updating, based on the second set of I/O operations, the log indicating the number of pending I/O operations to be performed at the storage device;
    comparing, based on the updated log, the pending of number of I/O operations to the maximum number of command slots of the storage device;
    determining, based on the comparing, that the pending number I/O operations of the updated log is within a second threshold of the maximum number of command slots of the storage device, wherein the second threshold of the maximum number of command slots of the storage device is i) greater than the first threshold and ii) less than the maximum number of command slots of the storage device, and in response:
    providing, to the storage device and at the second throughput, a third set of I/O operations for processing at the storage device.

2. The computer-implemented method of claim 1, wherein the storage device is a small computer system interface (SCSI) computing device.

3. The computer-implemented method of claim 1, wherein determining that the pending number of I/O is within the first threshold of the maximum number of command slots of the storage device further includes the pending number of I/O operations being less than the maximum number of command slots of the storage device.

4. The computer-implemented method of claim 1, further comprising:
    determining, based on the comparing, that the pending number I/O operations is within the first threshold of the maximum number of command slots of the storage device, and in response:
    identifying a number of the first set of I/O operations that are completed by the storage device;
    updating the log based on the number of the first set of I/O operations that are completed by the storage device; and
    providing, to the storage device and at the second throughput, the second set of I/O operations for processing at the storage device.

5. The computer-implemented method of claim 1, further comprising:
    determining, based on the comparing, that the pending number I/O operations is within the second threshold of the maximum number of command slots of the storage device, and in response:
    identifying a number of the second set of I/O operations that are completed by the storage device;
    updating the log based on the number of the second set of I/O operations that are completed by the storage device; and
    providing, to the storage device and at the second throughput, the third set of I/O operations for processing at the storage device.

6. The computer-implemented method of claim 4, further comprising:
    updating, based on the second set of I/O operations, the log indicating the number of pending I/O operations to be performed at the storage device;
    comparing the pending number of I/O operations to the maximum number of command slots of the storage device;
    determining, based on the comparing, that the pending number I/O operations is not within the second threshold of the maximum number of command slots of the storage device, and in response:
    providing, to the storage device and at the first throughput, a fourth set of I/O operations for processing at the storage device.

7. The computer-implemented method of claim 1, further comprising:
    determining, based on the comparing, that the pending number I/O operations is not within the first threshold of the maximum number of command slots of the storage device, and in response:
    providing, to the storage device and at the first throughput, a fifth set of I/O operations for processing at the storage device.

8. An information handling system comprising a processor having access to memory media storing instructions executable by the processor to perform operations, comprising:
    storing data indicating a maximum number of command slots associated with the storage device at a control extension mode page of the storage device;
    querying storage device to identify the maximum number of command slots associated with the storage device;
    providing, to the storage device and at a first throughput, a first set of input/output (I/O) operations for processing at the storage device;
    updating, based on the first set of I/O operations, a log indicating a number of pending I/O operations to be performed at the storage device;

comparing the pending number of I/O operations to the maximum number of command slots of the storage device; and determining, based on the comparing, that the pending number of I/O operations is within a first threshold of the maximum number of command slots of the storage device, wherein the first threshold of the maximum number of command slots of the storage device is less than the maximum number of command slots of the storage device, and in response:

providing, to the storage device and at a second throughput, a second set of I/O operations for processing at the storage device, the second throughput less than the first throughput;

updating, based on the second set of I/O operations, the log indicating the number of pending I/O operations to be performed at the storage device;

comparing, based on the updated log, the pending of number of I/O operations to the maximum number of command slots of the storage device;

determining, based on the comparing, that the pending number I/O operations of the updated log is within a second threshold of the maximum number of command slots of the storage device, wherein the second threshold of the maximum number of command slots of the storage device is i) greater than the first threshold and ii) less than the maximum number of command slots of the storage device, and in response:

providing, to the storage device and at the second throughput, a third set of I/O operations for processing at the storage device.

9. The information handling system of claim 8, wherein the storage device is a small computer system interface (SCSI) computing device.

10. The information handling system of claim 8, wherein determining that the pending number of I/O is within the first threshold of the maximum number of command slots of the storage device further includes the pending number of I/O operations being less than the maximum number of command slots of the storage device.

11. The information handling system of claim 8, the operations further comprising:

determining, based on the comparing, that the pending number I/O operations is within the first threshold of the maximum number of command slots of the storage device, and in response:

identifying a number of the first set of I/O operations that are completed by the storage device;

updating the log based on the number of the first set of I/O operations that are completed by the storage device; and providing, to the storage device and at the second throughput, the second set of I/O operations for processing at the storage device.

12. The information handling system of claim 8, the operations further comprising:

determining, based on the comparing, that the pending number I/O operations is within the second threshold of the maximum number of command slots of the storage device, and in response:

identifying a number of the second set of I/O operations that are completed by the storage device;

updating the log based on the number of the second set of I/O operations that are completed by the storage device; and providing, to the storage device and at the second throughput, the third set of I/O operations for processing at the storage device.

13. A non-transitory computer-readable medium storing software comprising instructions executable by one or more computers which, upon such execution, cause the one or more computers to perform operations comprising:

storing data indicating a maximum number of command slots associated with the storage device at a control extension mode page of the storage device;

querying the storage device to identify the maximum number of command slots associated with the storage device;

providing, to the storage device and at a first throughput, a first set of input/output (I/O) operations for processing at the storage device;

updating, based on the first set of I/O operations, a log indicating a number of pending I/O operations to be performed at the storage device;

comparing the pending number of I/O operations to the maximum number of command slots of the storage device; and determining, based on the comparing, that the pending number of I/O operations is within a first threshold of the maximum number of command slots of the storage device, wherein the first threshold of the maximum number of command slots of the storage device is less than the maximum number of command slots of the storage device, and in response:

providing, to the storage device and at a second throughput, a second set of I/O operations for processing at the storage device, the second throughput less than the first throughput;

updating, based on the second set of I/O operations, the log indicating the number of pending I/O operations to be performed at the storage device;

comparing, based on the updated log, the pending of number of I/O operations to the maximum number of command slots of the storage device;

determining, based on the comparing, that the pending number I/O operations of the updated log is within a second threshold of the maximum number of command slots of the storage device, wherein the second threshold of the maximum number of command slots of the storage device is i) greater than the first threshold and ii) less than the maximum number of command slots of the storage device, and in response:

providing, to the storage device and at the second throughput, a third set of I/O operations for processing at the storage device.

* * * * *